(12) United States Patent
Kashikar

(10) Patent No.: US 11,029,710 B2
(45) Date of Patent: Jun. 8, 2021

(54) METHOD AND SYSTEM FOR REAL-TIME TRACKING OF A MOVING TARGET OBJECT

(71) Applicant: Wipro Limited, Bangalore (IN)

(72) Inventor: Ramakrishna Kashikar, Hyderabad (IN)

(73) Assignee: Wipro Limited, Bangalore (IN)

( * ) Notice: Subject to any disclaimer, the term of this patent is extended or adjusted under 35 U.S.C. 154(b) by 111 days.

(21) Appl. No.: 16/275,519

(22) Filed: Feb. 14, 2019

(65) Prior Publication Data

US 2020/0209896 A1    Jul. 2, 2020

(30) Foreign Application Priority Data

Dec. 31, 2018    (IN) .............................. 201841049971

(51) Int. Cl.
  *G05D 1/12*    (2006.01)
  *G05D 1/02*    (2020.01)

(52) U.S. Cl.
  CPC .............. *G05D 1/12* (2013.01); *G05D 1/0212* (2013.01); *G05D 1/0246* (2013.01)

(58) Field of Classification Search
  CPC ....... G05D 1/12; G05D 1/0246; G05D 1/0212
  See application file for complete search history.

(56) References Cited

U.S. PATENT DOCUMENTS

| 9,751,210 B2 | 9/2017 | Fong et al. |
| 2009/0002489 A1 | 1/2009 | Yang et al. |
| 2009/0063306 A1* | 3/2009 | Fano ................... G06Q 10/087 705/28 |
| 2016/0224856 A1* | 8/2016 | Park ........................ G06K 9/46 |
| 2019/0005479 A1* | 1/2019 | Glaser ..................... G06F 21/32 |

FOREIGN PATENT DOCUMENTS

CN    103558856 A    2/2014

OTHER PUBLICATIONS

Khan et al., "Image Based Solution to Occlusion Problem for Multiple Robots Navigation", Mehran University Research Journal of Engineering & Technology, 2009, pp. 211-218, vol. 31, No. 2.

* cited by examiner

*Primary Examiner* — Peter D Nolan
*Assistant Examiner* — Ashley L Redhead, Jr.
(74) *Attorney, Agent, or Firm* — Finnegan, Henderson, Farabow, Garrett & Dunner, LLP

(57) ABSTRACT

Embodiments of present disclosure relates to method and system for real-time tracking of moving target object. Initially, occlusion in view of real-time tracking of moving target object is detected. Occlusion comprises one of complete occlusion and partial occlusion in the view. Further, upon detection and until moving target object is retraced by overcoming the occlusion, at least one subsequent movement of object tracking system for retracing the moving target object and direction of movement of the object tracking system is varied based on at least one subsequent movement. The at least one subsequent movement is determined based on at least one of one or more potential locations associated with moving target object, one or more preceding movements and one or more preceding positions of real-time tracking of moving target object, or movement data associated with occlusion. The present disclosure provisions dynamic retracing of moving target object with presence of occlusion.

15 Claims, 9 Drawing Sheets

METHOD AND SYSTEM FOR REAL-TIME TRACKING OF A MOVING TARGET OBJECT

This application claims the benefit of Indian Patent Application Serial No. 201841049971, filed Dec. 31, 2018, which is hereby incorporated by reference in its entirety.

FIELD

The present subject matter is related in general to object tracking systems, more particularly, but not exclusively to a method and system for real-time tracking of a moving target object when an occlusion is detected.

BACKGROUND

Tracking objects in an environment with a plurality of other objects may be a difficult and cumbersome process. Further, tracking an object when the object is partially visible or completely invisible may also be difficult. Existing technology provision robotic systems including tracking features to track an object. However, complexity arising due to visibility conditions of the object may not be handled by such systems. Such complexity may be due to occlusions and dynamic conditions in the environment of the object.

One or more existing systems include deep learning methods and powerful edge computing devices for object detection in real time. However, it may be still a challenge for detecting an object when the object and the occlusion are moving. Time consumed by the one or more existing systems may increase with increase in complexity of the visibility. Efficiency of the tracking may also be reduced in such cases. Also, the one or more existing systems may include limitation due to occlusion practical application, background clutter, lighting changes, changes in scale and shape of the object and so on.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of real-time tracking of a moving target object. Initially, an occlusion in a view of real-time tracking of a moving target object is detected. The occlusion includes a complete occlusion or a partial occlusion in the view of the real-time tracking. Further, upon the detection and until the moving target object is retraced by overcoming the occlusion, at least one subsequent movement of the object tracking system is determined for retracing the moving target object and direction of movement of the object tracking system is varied based on the at least one subsequent movement. The at least one subsequent movement is determined based on at least one of one or more potential locations associated with the moving target object, one or more preceding movements and one or more preceding positions of the real-time tracking of the moving target object, or movement data associated with the occlusion.

In an embodiment, the present disclosure relates to an object tracking system for real-time tracking of a moving target object. The object tracking system includes a processor and a memory communicatively coupled to the processor. The memory stores processor-executable instructions, which on execution cause the processor to track the moving target object in real-time. Initially, an occlusion in a view of real-time tracking of a moving target object is detected. The occlusion includes a complete occlusion or a partial occlusion in the view of the real-time tracking. Further, upon the detection and until the moving target object is retraced by overcoming the occlusion, at least one subsequent movement of the object tracking system is determined for retracing the moving target object and direction of movement of the object tracking system is varied based on the at least one subsequent movement. The at least one subsequent movement is determined based on at least one of one or more potential locations associated with the moving target object, one or more preceding movements and one or more preceding positions of the real-time tracking of the moving target object, or movement data associated with the occlusion.

In an embodiment, the present disclosure relates to a non-transitory computer readable medium including instructions stored thereon that when processed by at least one processor cause a device to perform real-time tracking of a moving target object. Initially, an occlusion in a view of real-time tracking of a moving target object is detected. The occlusion includes a complete occlusion or a partial occlusion in the view of the real-time tracking. Further, upon the detection and until the moving target object is retraced by overcoming the occlusion, at least one subsequent movement of the object tracking system is determined for retracing the moving target object and direction of movement of the object tracking system is varied based on the at least one subsequent movement. The at least one subsequent movement is determined based on at least one of one or more potential locations associated with the moving target object, one or more preceding movements and one or more preceding positions of the real-time tracking of the moving target object, or movement data associated with the occlusion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
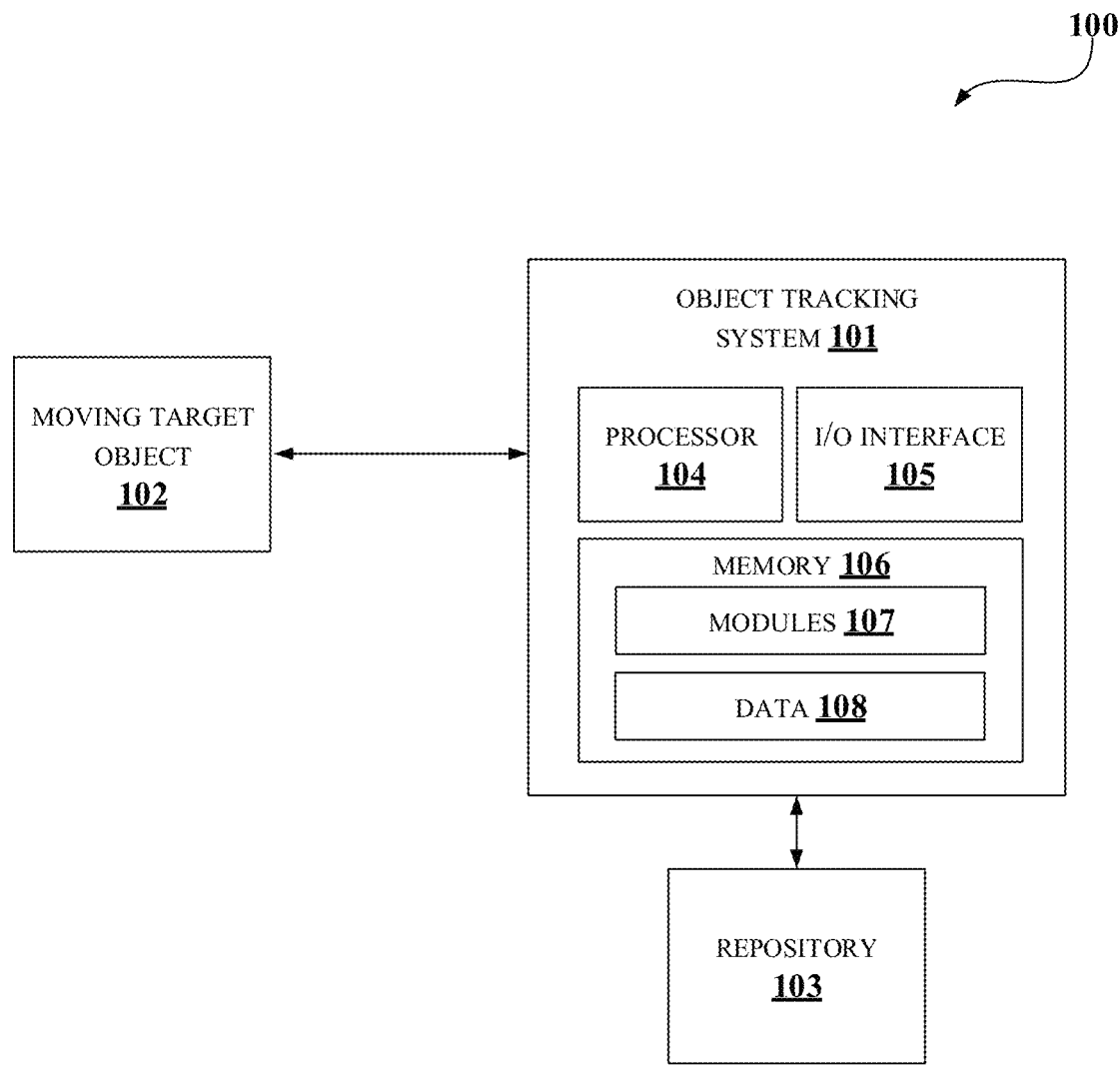
FIG. 1 shows an exemplary environment of an object tracking system for real-time tracking of a moving target object, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to tracking system configured to detect and track a moving target object in real-time. A learning method is implemented in the present disclosure to retrace the moving target object, when an occlusion is detected. Previously stored data, including preceding movements, preceding positions, potential locations, and movements of the occlusion, is considered to determine subsequent movement of the tracking system. Using the subsequent movement, the moving target object is retraced efficiently, to proceed with the tracking in real-time. Further, using the subsequent movement, the present disclosure is configured to determine subsequent positions of the moving target object. This data may be used when an occlusion is detected during further tracking of the moving target object.

FIG. 1 shows an exemplary environment 100 of an object tracking system 101 for real-time tracking of a moving target object 102, in accordance with some embodiments of the present disclosure. The exemplary environment 100 may include the object tracking system 101, the moving target object 102 and a repository 103. The object tracking system 101 may be configured to perform steps of the present disclosure. The object tracking system 101 may be a robotic system configured to lock onto a target object and move based on movement of the target object. The object tracking system 101 may be implemented in many applications including, but not limited to smart cart configure to follow a customer in a shopping location, follow bots configured to follow a targeted entity, carriage vehicle configured to load and unload products in big warehouses, and so on. The moving target object 102 may be selected based on the application. For example, in the smart cart application, the moving target object 102 shall be a customer in the shopping location. One or more techniques, known to person skilled in the art may be implemented in the object tracking system 101, to perform real-time tracking of the moving target object 102. In an embodiment, the object tracking system 101 may be configured to track the moving target object 102 using image processing techniques. The object tracking system 101 may be associated with an image capturing unit (not shown in FIG. 1). The image capturing unit may be configured to retrieve one of images or videos of the moving target object 102 to perform the real-time tracking.

The repository 103 associated with the object tracking system 101 is configured to store data associated with at least one of the moving target object 102, the object tracking system 101 and occlusion which is detected during the real-time tracking. For example, the repository 103 may store movements and locations of the moving target object 102 during the real-time tracking. When the occlusion is detected during the real-time tracking, the data stored in the repository 103 may be used for retracing the moving target object 102 to overcome the occlusion. In an embodiment, the repository 103 may be an integral part of the object tracking system 101. In an embodiment, the object tracking system 101 may communicate with the repository 103 through a communication network (not shown in the figure) to receive and transmit the data. In an embodiment, the communication network may include, without limitation, a direct interconnection, Local Area Network (LAN), Wide Area Network (WAN), Controller Area Network (CAN), wireless network (e.g., using Wireless Application Protocol), the Internet, and the like.

Further, the object tracking system 101 may include a processor 104, I/O interface 105, and a memory 106. In some embodiments, the memory 106 may be communicatively coupled to the processor 104. The memory 106 stores instructions, executable by the processor 104, which, on execution, may cause the object tracking system 101 to perform real-time tracking of the moving target object 102, as disclosed in the present disclosure. In an embodiment, the memory 106 may include one or more modules 107 and data 108. The one or more modules 107 may be configured to perform the steps of the present disclosure using the data 108, to perform real-time tracking of the moving target object 102. In an embodiment, each of the one or more modules 107 may be a hardware unit which may be outside the memory 106 and coupled with the object tracking system 101. The object tracking system 101 may be implemented in a variety of computing systems, such as a laptop computer, a desktop computer, a Personal Computer (PC), a notebook, a smartphone, a tablet, e-book readers, a server, a network server, a cloud-based server and the like.

In the present disclosure, during the real-time tracking of the moving target object 102, an occlusion may be encountered in a view of the object tracking system 101. The occlusion may be any obstacle present in between the moving target object 102 and the object tracking system 101. The occlusion may prohibit the object tracking system 101 from tracking the moving target object 102. The object tracking system 101 need to be configured to retrace the moving target object 102 by overcoming the occlusion. When the occlusion is encountered, the object tracking system 101 is configured to detect the occlusion in a view of real-time tracking of the moving target object 102. Further, the object tracking system 101 is configured to determine the occlusion to be one of, a complete occlusion and a partial occlusion in the view of the real-time tracking. The occlusion is said to be the complete occlusion when the moving target is completely covered with the occlusion. In the complete occlusion, the object tracking system 101 may not be able to view the moving target object 102. The occlusion is said to be the partial occlusion when the moving target is partially covered with the occlusion. In the partial occlusion, the object tracking system 101 may be able to view a part of the moving target object 102. One or more techniques, known to a person skilled in the art may be implemented for detecting the occlusion and determining the occlusion to be one of, the complete occlusion and the partial occlusion.

Further, upon the detection and until the moving target object 102 is retraced by overcoming the occlusion, at least one subsequent movement of the object tracking system 101 may be determined for retracing the moving target object 102. Direction of movement of the object tracking system 101 is varied based on the at least one subsequent movement. The at least one subsequent movement is determined based on at least one of one or more potential locations associated with the moving target object 102, one or more preceding movements and one or more preceding positions of the real-time tracking of the moving target object 102, and movement data associated with the occlusion. The at least one of the one or more potential locations, the one or more preceding movements, the one or more preceding positions, and the movement data may be stored in the repository 103 and retrieved from the repository 103 for determining the at least one subsequent movement.

In an embodiment, the one or more potential locations indicate possible locations that the moving target object 102 may be found in the exemplary environment 100. In an embodiment, the one or more potential locations may be determined by the object tracking system 101. One or more techniques, known to a person skilled in the art, may be implemented for determining the one or more potential locations.

In an embodiment, the one or more preceding movements may include movements of the moving target object 102 before the detection of the occlusion, during the real-time tracking. In an embodiment, the one or more preceding positions may include positions of the moving target object 102 before the detection of the occlusion, during the real-time tracking. In an embodiment, the movement data may include movement of the occlusion after the detection of the occlusion. In an embodiment, the object tracking system 101 may be configured to monitor the movement of the occlusion, upon the detection of the occlusion. The movement data may be used dynamically to determine the at least one subsequent movement.

In the present disclosure, when the complete occlusion is detected, the at least one subsequent movement may be determined based on the one or more potential locations for varying the direction of movement of the object tracking system 101.

Further, the present disclosure is configured to determine the partial occlusion to be one of greater than and lesser than a predefined threshold value. When the partial occlusion is greater than the predefined threshold value, the at least one subsequent movement is determined based on the movement data associated with the occlusion. When the partial occlusion is lesser than a predefined threshold value, the at least one subsequent movement is determined based on at least one of the one or more preceding positions and the one or more preceding movements of the moving target object 102.

In an embodiment, the object tracking system 101 is configured to determine one or more subsequent locations associated with the moving target object 102, based on the direction of movement. In an embodiment, the one or more subsequent locations may be stored in the repository 103 as the one or more potential locations and be used for further real-time tracking of the object tracking system 101.

Figure 2:
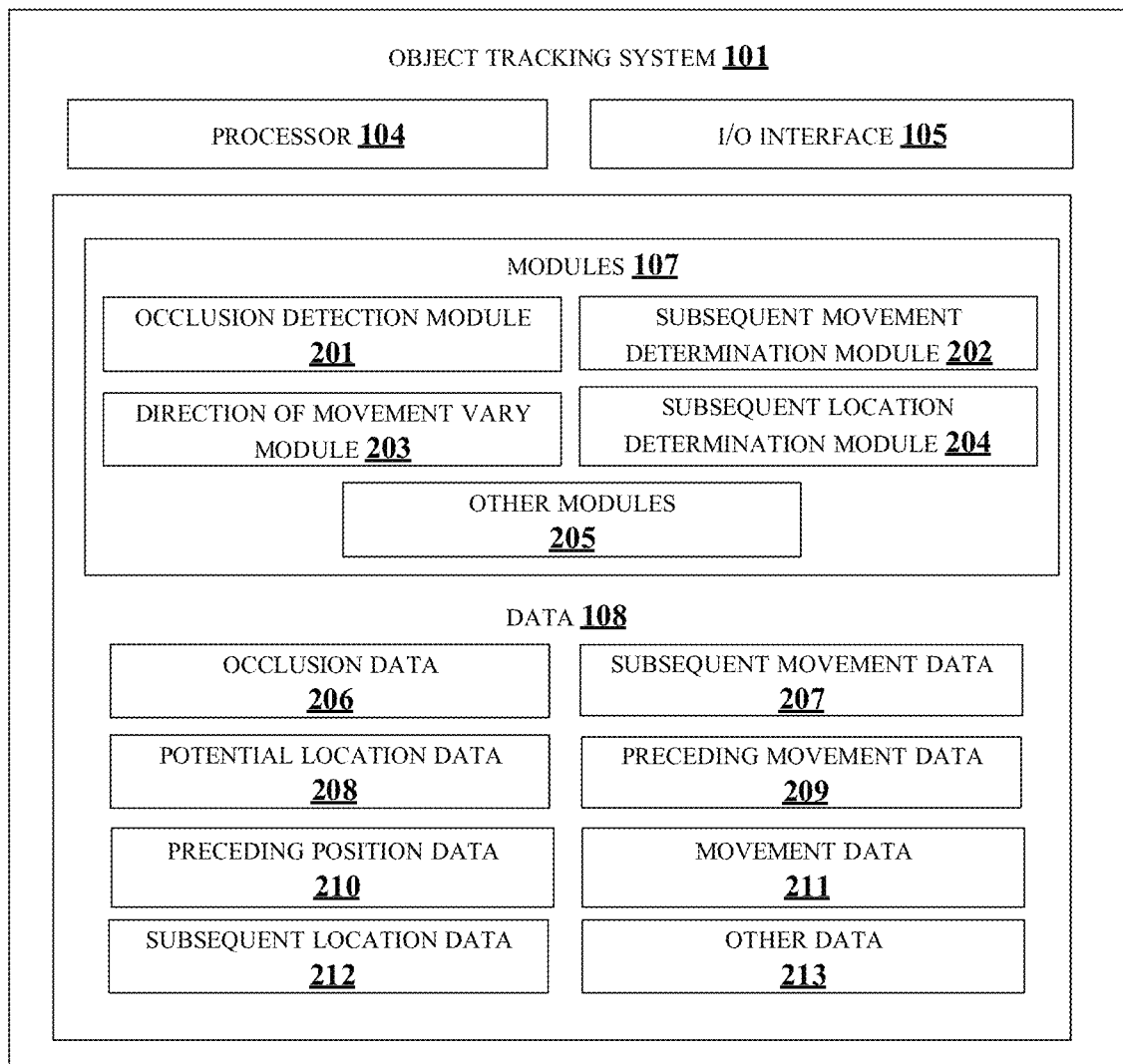
FIG. 2 shows a detailed block diagram of an object tracking system for real-time tracking of a moving target object, in accordance with some embodiments of the present disclosure.

FIG. 2 shows a detailed block diagram of the object tracking system 101 for real-time tracking of the moving target object 102, in accordance with some embodiments of the present disclosure;

The data 108 and the one or more modules 107 in the memory 106 of the object tracking system 101 may be described herein in detail.

In one implementation, the one or more modules 107 may include, but are not limited to, an occlusion detection module 201, a subsequent movement determination module 202, a direction of movement vary module 203 and a subsequent location determination module 204 and one or more other modules 205, associated with the object tracking system 101.

In an embodiment, the data 108 in the memory 106 may include occlusion data 206 (also referred to as occlusion 206), subsequent movement data 207 (also referred to as at least one subsequent movement 207), potential location data 208 (also referred to as one or more potential locations 208), preceding movement data 209 (also referred to as one or more preceding movements 209), preceding position data 210 (also referred to as one or more preceding positions 210), movement data 211, subsequent location data 212 (also referred to as one or more subsequent locations 212) and other data 213 associated with the object tracking system 101.

In an embodiment, the data 108 in the memory 106 may be processed by the one or more modules 107 of the object tracking system 101. In an embodiment, the one or more modules 107 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

Figure 3A:
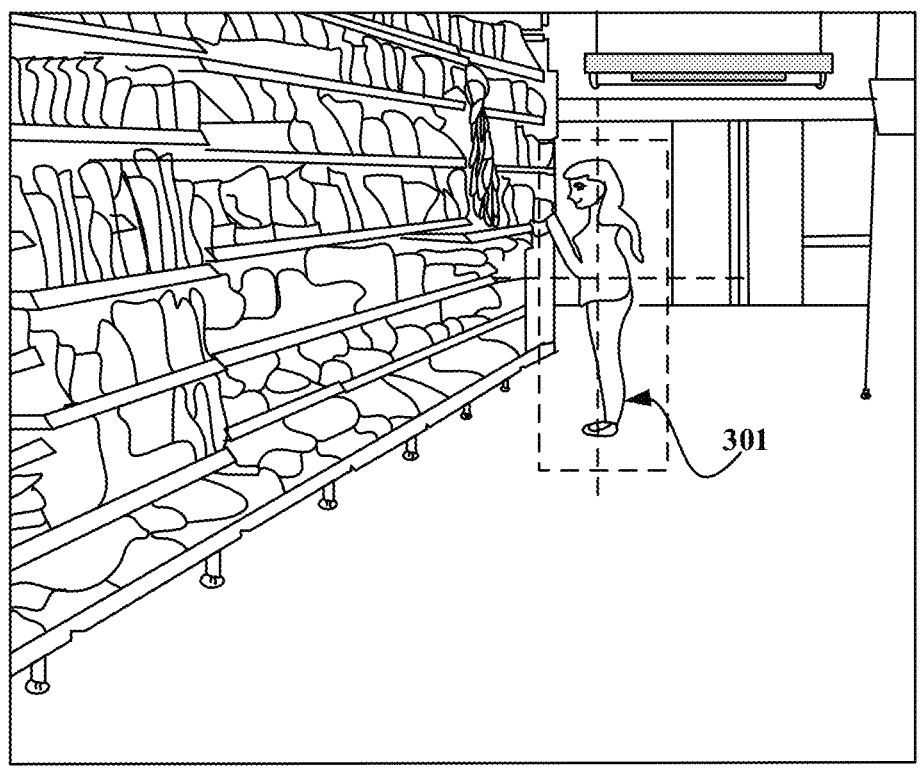
FIGS. 3a-3d illustrate exemplary scenarios for real-time tracking of a moving target object, in accordance with some embodiments of present disclosure.

The one or more modules 107 of the present disclosure function to perform real-time tracking of the moving target object 102 and also, retrace the moving target object 102, when an occlusion 206 may be detected in a view of the real-time tracking. The object tracking system 101 may be used in any application where there is a need to track the moving target object 102. For example, consider an exemplary scenario illustrated in FIG. 3*a*, in a super market. The object tracking system 101 may be implemented in a smart cart in the super market. By this, the smart cart may be configured to follow a customer eliminating the need for the customer to push or pull the smart cart manually. As the smart cart follows the customer, items which the customer wishes to buy, may be dropped into the smart cart by the customer. The exemplary scenario in FIG. 3*a* shows a view of the object tracking system 101, implemented in the smart cart. Here, the moving target object 301 is a customer. The object tracking system 101 may lock onto the moving target object 301 to track in real-time and follow the moving target object 301 during shopping, until the customer checks out. In an embodiment, the object tracking system 101 may implement an image processing technique for performing the real-time tracking. In an embodiment, Visual Simultaneous Localization and Mapping (VSLAM) technique may be implemented for the real-time tracking. The VSLAM technique is a deep learning framework used to track a target object. During the real-time tracking, the object tracking system 101 may be configured to monitor path followed by the moving target object 301 and location associated with the moving target object 301. In an embodiment, the VSLAM techniques helps in logging the path and the locations. Such logged path and locations may be stored in the repository 103 as the one or more preceding movements 209 and the one or more preceding positions 210 of the moving target object 301. In the embodiment, the other modules 205 of the object tracking system 101 may be configured to determine the one or more potential locations 208 of the moving target object 301. The one or more potential locations 208 may be determined based on historic data associated with the moving target object 301. In an embodiment, the one or more potential locations 208 may also be stored in the repository 103 associated with the object tracking system 101. In an embodiment, the one or more preceding movements 209, the one or more preceding positions 210, and the one or more potential locations 208 may be retrieved from the repository 103 and stored in the memory 106 of the object tracking system 101, for the real-time tracking.

During the real-time tracking of the moving target object 301, it may be possible that an occlusion 206 may be encountered in the view of the object tracking system 101. The occlusion 206 prohibits the object tracking system 101 from tracking the moving target object 301. The occlusion detection module 201 may be configured to detect the occlusion 206 in the view of real-time tracking of the moving target object 301. For the exemplary scenario illustrated in FIG. 3*a*, the occlusion 206 may be another customer who is passing in the view of the object tracking system 101, a smart cart which is configured to track another customer, and so on. In an embodiment, the occlusion detection module 201 may be an image processing module configured to retrieve images of the moving target object 301 and process the images to detect the occlusion 206. One or more other techniques, known to a person skilled in the art, may be implemented in the occlusion detection module 201, for detecting the occlusion 206. In an embodiment, at least one of information on detection of an occlusion, type of occlusion, movement and position of occlusion may be stored as the occlusion data 206 in the memory 106.

The detected occlusion 206 may be a complete occlusion or a partial occlusion in the view of the real-time tracking. The occlusion detection module 201 may be configured to determine the occlusion 206 to be one of the complete occlusion and the partial occlusion based on percentage of coverage of the moving target object 301. In an embodiment, output of the occlusion detection module 201 may be stored as the occlusion data 206 in the memory 106. For example, if 100% of the moving target object 301 is covered by the occlusion, the occlusion detection module 201 may determine the occlusion 206 to be the complete occlusion. If 20% or 50% or any amount lesser than the 100% of the moving target object 301 is covered by the occlusion, the occlusion detection module 201 may determine the occlusion 206 to be the partial occlusion. In an embodiment, if the moving target object 301 is visible for more than a specific limit, for example, 98%, the occlusion detection module 201 may determine the occlusion 206 to be the complete occlusion.

Further, upon the detection of the occlusion, the moving target object 301 is to be retraced. The retracing of the moving target object 301 may be performed by overcoming the occlusion. For overcoming the occlusion, the subsequent movement determination module 202 may be configured to determine the at least one subsequent movement 207 of the object tracking system 101. The at least one subsequent movement 207 may be determined based on at least one of the one or more potential locations 208 associated with the moving target object 301, the one or more preceding movements 209 and the one or more preceding positions 210 of the real-time tracking of the moving target object 301, and the movement data 211 associated with the occlusion.

Further, based on the at least one subsequent movement 207, the direction of movement vary module 203 may be configured to vary direction of movement of the object tracking system 101. In an embodiment, the direction of movement vary module 203 may be an actuator configured to move the object tracking system 101, for retracing the moving target object 301. For example, based on at least one of the one or more potential locations 208, the one or more preceding movements 209, the one or more preceding positions 210, and the movement data 211, the at least one subsequent movement 207 may be determined to be backward movement of the object tracking system 101, for overcoming the occlusion. The direction of movement vary module 203 may be configured to move the object tracking system 101 backwards to achieve the retracing of the moving target object 301. Similarly, based on at least one of the one or more potential locations 208, the one or more preceding movements 209, the one or more preceding positions 210, and the movement data 211, the at least one subsequent movement 207 may be determined to be leftward movement of the object tracking system 101, for overcoming the occlusion. The direction of movement vary module 203 may be configured to move the object tracking system 101 towards left, to achieve the retracing of the moving target object 301.

Figure 3B:
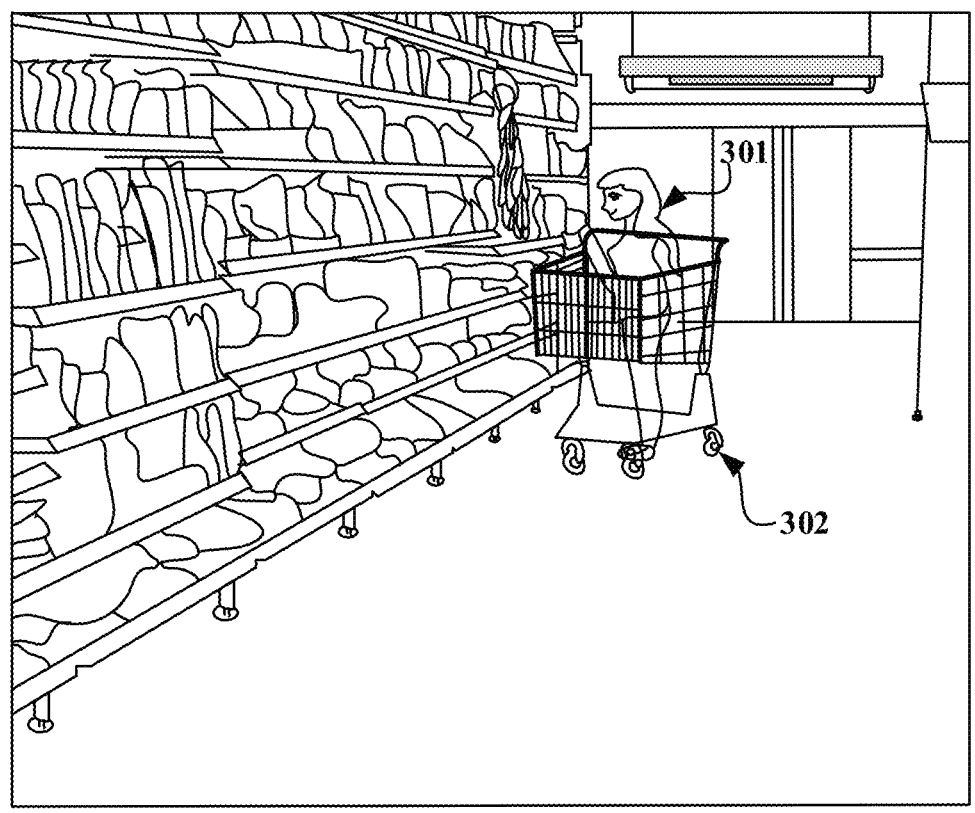

Consider an exemplary scenario illustrated in FIG. 3*b*. Consider the occlusion detection module 201 detects an occlusion 302 to be the complete occlusion. When the complete occlusion is detected, the subsequent movement determination module 202 may be configured to determine the at least one subsequent movement 207 based on the one or more potential locations 208. For example, the one or more potential locations 208 of the moving target object 301 may be cash counter, vegetable section, pharmacy section and clothing section. In an embodiment, the subsequent movement determination module 202 may be configured to identify current location of the moving target object 301. Further, the subsequent movement determination module 202 may determine nearest location from the one or more potential locations 208 from the current location and determine the at least one subsequent movement 207, accordingly. For example, the current location may be the pharmacy section and the nearest location may be the case counter. The at least one subsequent movement 207 may be towards the cash counter. The direction of movement vary module 203 may be configured to move the object tracking system 101 towards the cash counter to retrace the moving target object 301. In an embodiment, while moving towards the cash counter, the object tracking system 101 may be configured to keep monitoring for the moving target object 301. In an embodiment, if the retracing of the moving target object 301 may not be achieving by moving towards the cash counter, next potential location may be considered to retrace the moving target object 301. In an embodiment, predefined number of potential locations are considered by the subsequent movement determination module 202, to achieve the retracing of the moving target object 301.

Figure 3C:
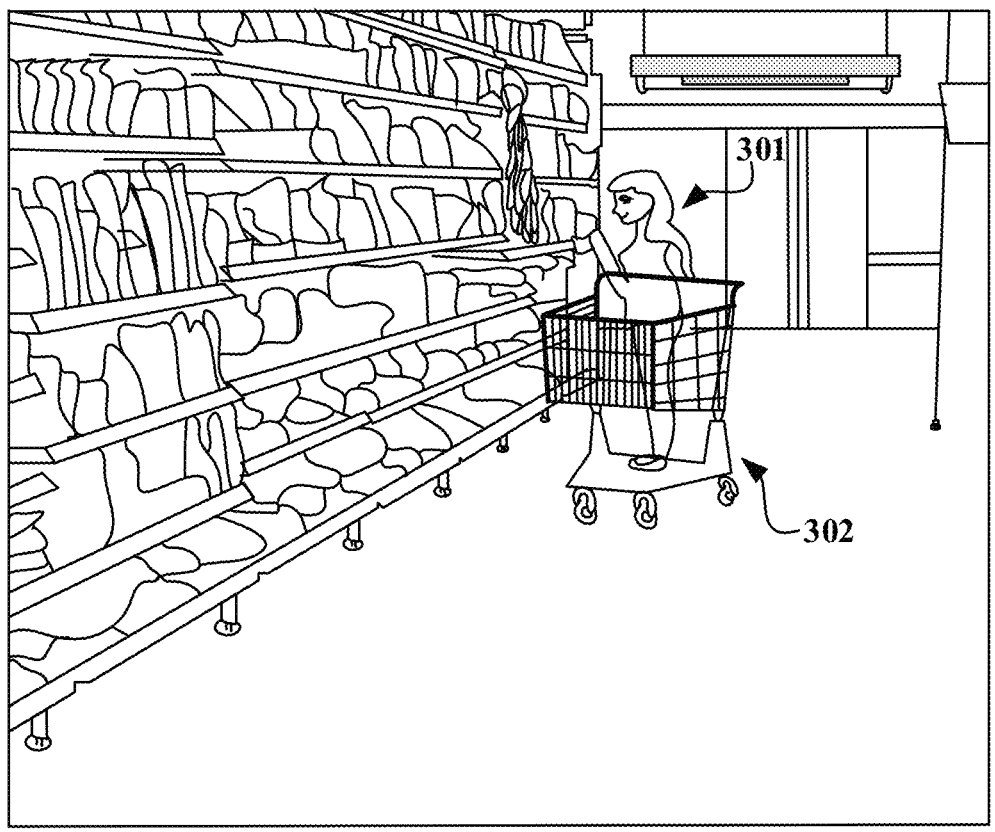

Consider an exemplary scenario illustrated in FIG. 3c. Consider the occlusion detection module 201 detects the occlusion 302 to be the partial occlusion greater than the predefined threshold value. For example, the predefined threshold value may be 25%. When the partial occlusion is greater than 25%, the at least one subsequent movement 207 may be determined based on the movement data 211 of the occlusion 302. The subsequent movement determination module 202 may dynamically monitor the movement data 211. Upon the detection of the occlusion 302, movement of the occlusion 302 or path followed by the occlusion 302 may be monitored by the subsequent movement determination module 202. In an embodiment, the subsequent movement determination module 202 may be configured to move in a direction opposite to the movement of the occlusion 302. Consider, in FIG. 3c, the occlusion 302 is moving towards right side of the view. The subsequent movement determination module 202 may be configured to determine the at least one subsequent movement 207 to be left side of the view, which is opposite to the direction of the occlusion 302. Based on the at least one subsequent movement 207, the direction of movement vary module 203 may be configured to move the object tracking system 101. In an embodiment, by determining the at least one subsequent movement 207, based on the movement data 211, visibility of the occlusion 302 may be reduced, to retrace the moving target object 301. The at least one subsequent movement 207 is determined, based on the movement data 211, and the movement of direction is varied, until the partial occlusion is lesser than the predefined threshold value. In an embodiment, this may continue until the moving target object 301 is completely visible to the object tracking system 101.

Figure 3D:

Consider an exemplary scenario illustrated in FIG. 3d. Consider the occlusion detection module 201 detects the occlusion 302 to be the partial occlusion which is lesser than the predefined threshold value. For example, the predefined threshold value may be 25%. When the partial occlusion is lesser than 25%, the at least one subsequent movement 207 may be determined based on at least one of the one or more preceding positions 210 and the one or more preceding movements 209 of the moving target object 301. As described previously, during the real-time tracking, the one or more preceding positions 210 and the one or more preceding movements 209 may be retrieved and stored in the memory 106. In the exemplary scenario illustrated in FIG. 3d, the one or more preceding positions 210 may be landmarks visited by the customer in the super market. For example, the one or more preceding positions 210 may be the vegetable section, the clothing section, and the pharmacy section. Similarly, the one or more preceding movements 209 may be path taken by the customer inside the super market. For example, the customer may enter the shopping and walk towards to the pharmacy and then may turn right and walk towards the clothing section. Consider, the occlusion 302 is detected to be 10%. Based on such one or more preceding positions 210 and such one or more preceding movements 209, the at least one subsequent movement 207 may be determined for varying the direction of movement of the object tracking system 101. In an embodiment, by determining the at least one subsequent movement 207 based on the one or more positions 210 and the one or more preceding movements 209, the movement of direction is varied to increase visibility of the moving target object 301. In an embodiment, this may continue until the moving target object 301 is completely visible to the object tracking system 101.

Upon retracing the moving target object 301, the subsequent location determination module 204 may be configured to determine the one or more subsequent locations 212 associated with the moving target object 301. The one or more subsequent locations 212 may be determined based on the direction of movement. The one or more subsequent locations 212 indicate potential locations predicted for the moving target object 301, based on the real-time tracking and retracing of the moving target object 301. In an embodiment, the one or more subsequent locations 212 may be stored in the repository 103 as the one or more potential locations 208 and may be used for further real-time tracking of the moving target object 301.

The other data 213 may store data, including temporary data and temporary files, generated by modules for performing the various functions of the object tracking system 101. The one or more modules 107 may also include other modules 205 to perform various miscellaneous functionalities of the object tracking system 101. It will be appreciated that such modules may be represented as a single module or a combination of different modules.

Figure 4A:
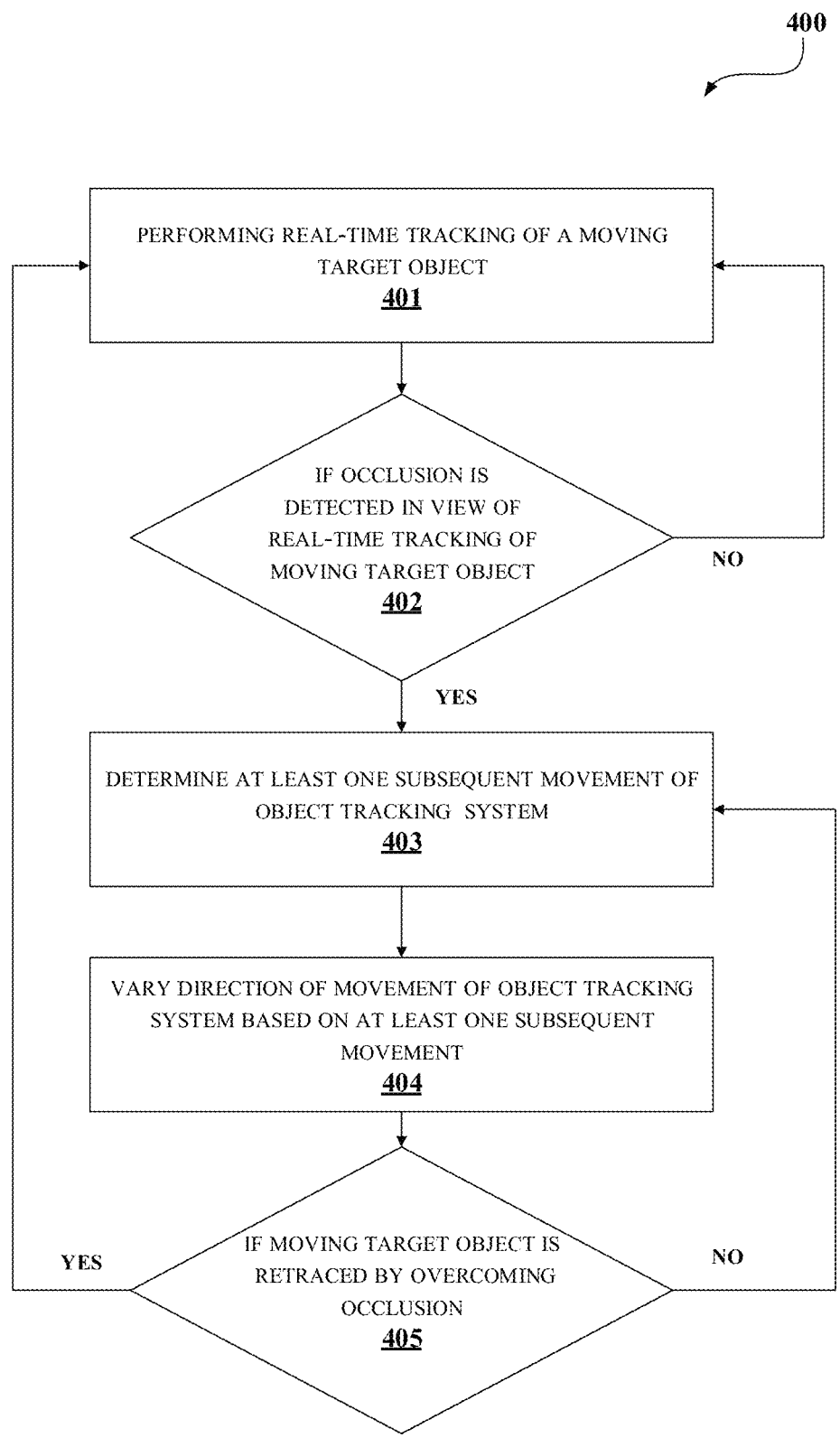
FIG. 4a illustrates a flowchart showing an exemplary method for real-time tracking of a moving target object, in accordance with some embodiments of present disclosure.

FIG. 4a illustrates a flowchart showing an exemplary method for the real-time tracking of the moving target object 102, in accordance with some embodiments of present disclosure.

At block 401, the object tracking system 101 may be configured to perform the real-time tracking of the moving target object 102. One or more techniques, known to a person skilled in the art, may be used for performing the tracking.

At block 402, the object tracking system 101 may be configured to check for detecting of the occlusion 206 in the view of the real-time tracking of the moving target object 102. When the occlusion 206 is detected, step in block 403 may be performed. When the occlusion 206 is not detected, step in block 401 may be performed to continue the real-time tracking of the moving target object 102.

Figure 4B:
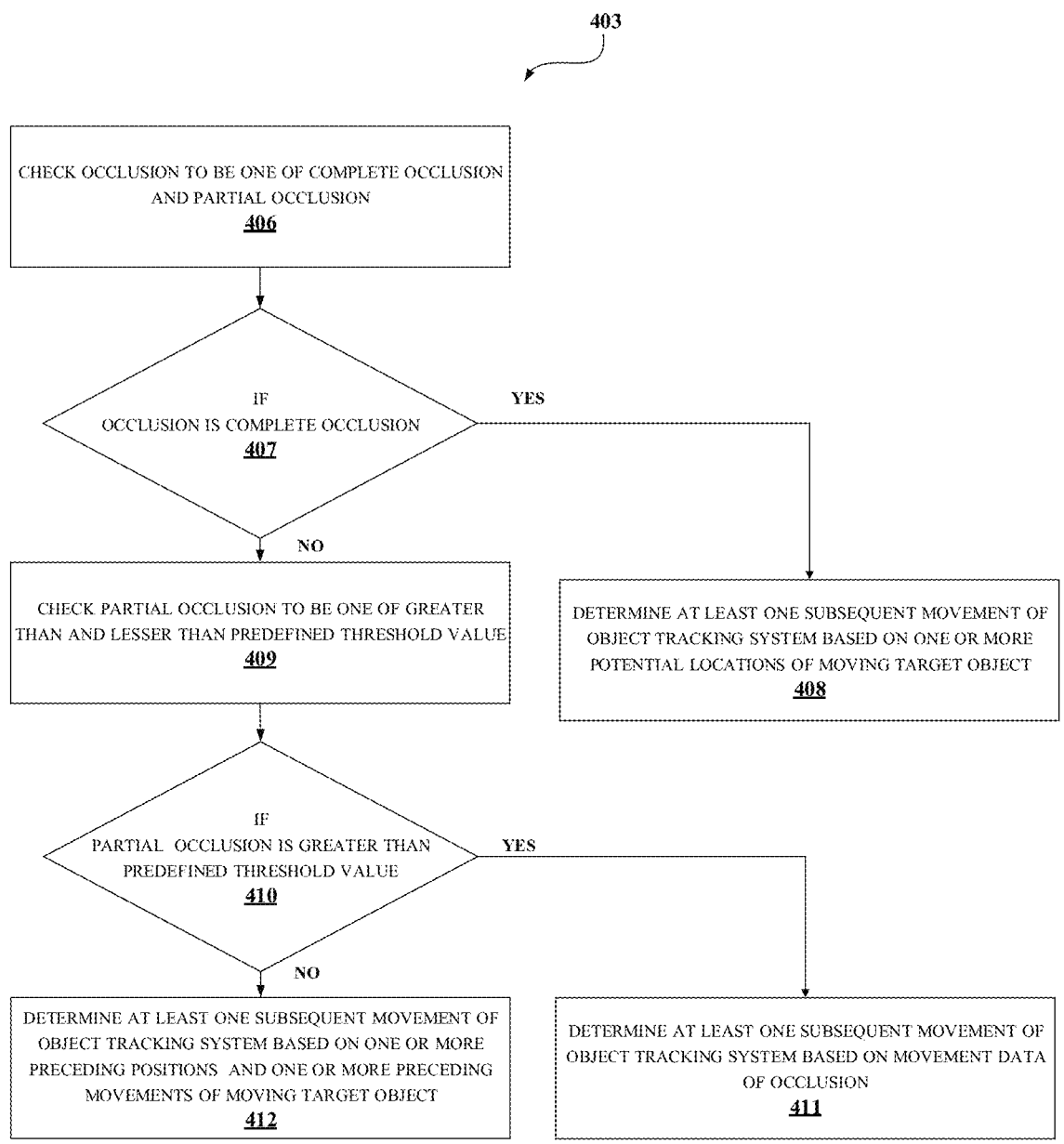
FIG. 4b illustrates a flowchart showing an exemplary method for determining at least one subsequent movement of object tracking system, in accordance with some embodiments of present disclosure.

At block 403, when the occlusion 206 is detected during the real-time tracking of the moving target object 102, the object tracking system 101 may be configured to determine the at least one subsequent movement 207 of the object tracking system 101. FIG. 4b illustrates a flowchart showing an exemplary method for determining the at least one subsequent movement 207 of the object tracking system 101, in accordance with some embodiments of present disclosure.

At block 406, the object tracking system 101 may be configured check the occlusion 206 to one of the complete occlusion and the partial occlusion.

At block 407, the object tracking system 101 may be configured to check if the occlusion 206 is the complete occlusion. When the occlusion 206 is determined to the complete occlusion, step at block 408 may be performed. When the occlusion 206 is determined to be the partial occlusion, step at block 409 may be performed.

At block 408, when the occlusion 206 is determined to be the complete occlusion, the object tracking system 101 may be configured to determine the at least one subsequent movement 207 based on the one or more potential locations 208. for varying the direction of movement of the object tracking system 101.

At block 409, when the occlusion 206 is determined to the partial occlusion, the object tracking system 101 may be configured to check if the partial occlusion is one of greater than and lesser than the predefined threshold value.

At block 410, the object tracking system 101 may be configured to check if the partial occlusion is greater than the predefined threshold value. When the partial occlusion is greater than the predefined threshold value, step at block 411 may be performed. When the partial occlusion is lesser than the predefined threshold value, step at block 412 may be performed.

At block 411, when the partial occlusion is greater than the predefined threshold value, the object tracking system 101 may be configured to determine the at least one subsequent movement 207 based on the movement data 211 of the occlusion.

At block 412, when the partial occlusion is lesser than the predefined threshold value, the object tracking system 101 may be configured to determine the at least one subsequent movement 207 based on at least one of the one or more preceding positions 210 and the one or more preceding movements 209.

Referring back to FIG. 4a, at block 404, based on the at least one of the subsequent movement 207, the object tracking system 101 may be configured to vary the direction of movement of the object tracking system 101.

At block 405, the object tracking system 101 may be configured to check if the moving target object 102 is retraced by overcoming the occlusion. When the moving target object 102 is retraced, the step in block 401 is performed to continue the real-time tracking. When the moving target object 102 is not retraced, the step in block 403 is performed to determine the at least one subsequent movement 207 and vary the direction of movement, until the moving target object 102 is retraced.

As illustrated in FIGS. 4a and 4b, the methods 400 and 403 may include one or more blocks for executing processes in the object tracking system 101. The methods 400 and 403 may be described in the general context of computer executable instructions. Generally, computer executable instructions can include routines, programs, objects, components, data structures, procedures, modules, and functions, which perform particular functions or implement particular abstract data types.

The order in which the methods 400 and 403 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 5:
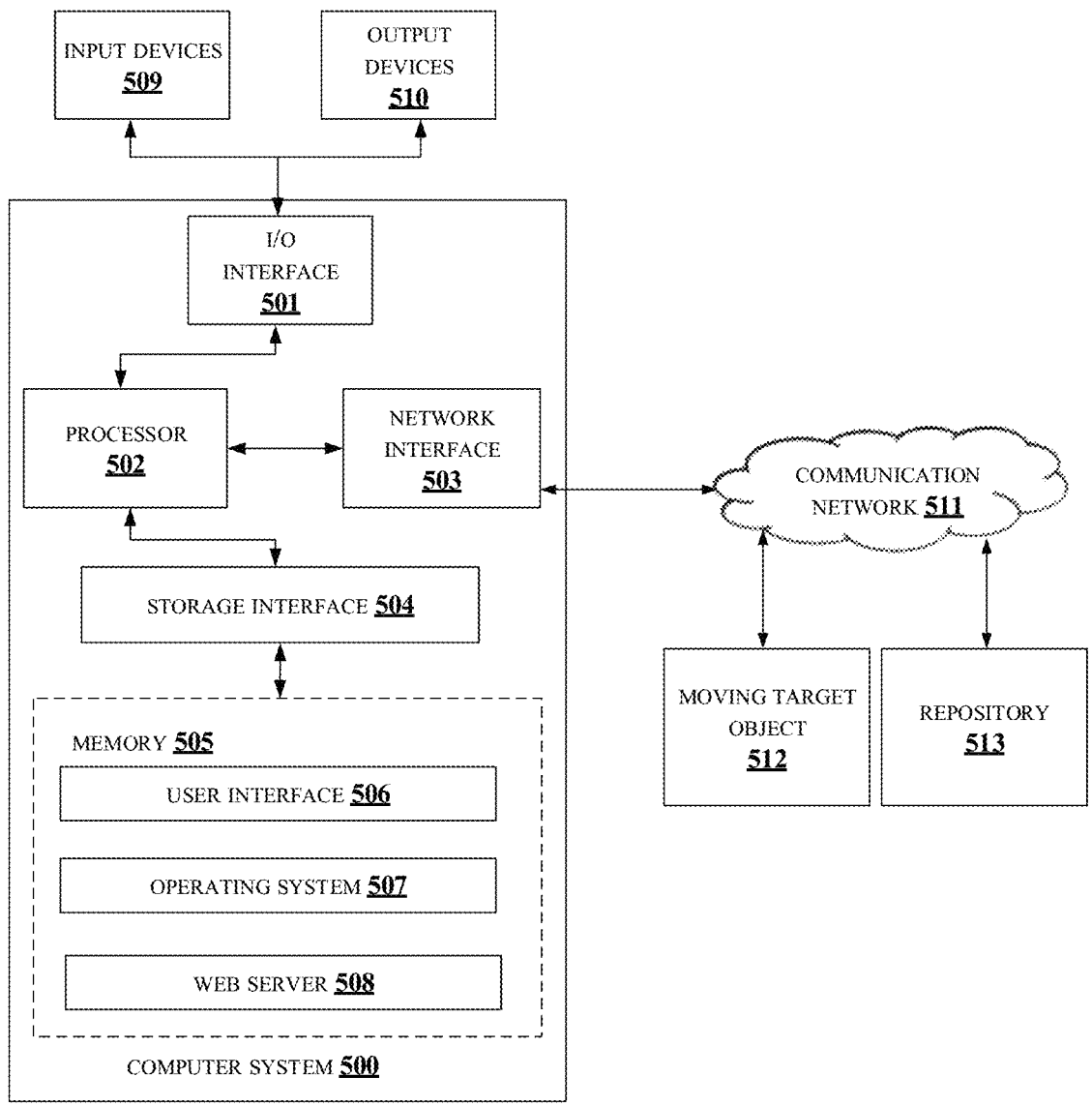
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the object tracking system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802. n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may comprise the object tracking system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with a moving target object 512 and a repository 513 for real-time tracking of the moving target object 512. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION (BSD), FREEBSD™, NETBSD™, OPENBSD™, etc.), LINUX DISTRIBUTIONS (E.G., RED HAT™, UBUNTU™, KUBUNTU™, etc.), IBM™ OS/2, MICROSOFT™ WINDOWS™ (XP™, VISTA™ /7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions to dynamically retrace a moving target object, when an occlusion is encountered during tracking.

An embodiment of the present disclosure implements a learning method for retracing the target object. By which, an improved retracing and real-time tracking may be achieved.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4a and 4b show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of real-time tracking of a moving target object in an environment, the method comprising:
    detecting, by an object tracking system, an occlusion in a view of real-time tracking of a moving target object, wherein the occlusion comprises one of a complete occlusion and a partial occlusion in the view of the real-time tracking; and
    performing, by the object tracking system, upon the detection and until the moving target object is retraced by overcoming the occlusion, the steps of:
        determining, by the object tracking system, at least one subsequent movement of the object tracking system for retracing the moving target object,
        (i) based on predefined number of potential locations associated with the moving target object, during the complete occlusion, wherein the potential locations are historic data indicative of nearest locations visited by the moving target object from a current location in the environment; and
        (ii) based on one or more preceding movements and one or more preceding positions of the real-time tracking of the moving target object, and movement data associated with the occlusion, during the partial occlusion, wherein the one or more preceding movements and the one or more preceding positions of the moving target object are determined using Visual Simultaneous Localization and Mapping (VSLAM) technique that logs one or more paths and one or more locations associated with the moving target object, before the detection of occlusion; and
        varying, by the object tracking system, direction of movement of the object tracking system based on the at least one subsequent movement, for the real-time tracking of the moving target object.

2. The method as claimed in claim 1 further comprising determining, by the object tracking system, one or more subsequent locations associated with the moving target object, based on the direction of movement, wherein the one or more subsequent locations are used as the potential locations for the real-time tracking.

3. The method as claimed in claim 1, wherein during the complete occlusion, the at least one subsequent movement is determined based on the potential locations for varying the direction of movement of the object tracking system.

4. The method as claimed in claim 1, wherein when the partial occlusion is greater than a predefined threshold value, the at least one subsequent movement is determined based on the movement data associated with the occlusion, for varying the direction of movement of the object tracking system.

5. The method as claimed in claim 1, wherein when the partial occlusion is lesser than a predefined threshold value, the at least one subsequent movement is determined based on at least one of the one or more preceding positions and the one or more preceding movements, for varying the direction of movement of the object tracking system.

6. An object tracking system for real-time tracking of a moving target object, the object tracking system comprising:
    a processor; and
    a memory communicatively coupled to the processor, wherein the memory stores processor-executable instructions, which, on execution, cause the processor to:
        detect an occlusion in a view of real-time tracking of a moving target object, wherein the occlusion comprises one of a complete occlusion and a partial occlusion in the view of the real-time tracking; and
        perform upon the detection and until the moving target object is retraced by overcoming the occlusion, the steps of:
            determining at least one subsequent movement of the object tracking system for retracing the moving target object,
            (i) based on potential locations associated with the moving target object, during the complete occlusion, wherein the potential locations are historic data indicative of nearest locations visited by the moving target object from a current location in the environment; and
            (ii) based on one or more preceding movements and one or more preceding positions of the real-time tracking of the moving target object, and movement data associated with the occlusion, during the partial occlusion, wherein the one or more preceding movements and the one or more preceding positions of the moving target object are determined using Visual Simultaneous Localization and Mapping (VSLAM) technique that logs one or more paths and one or more locations associated with the moving target object, before the detection of occlusion; and
            varying direction of movement of the object tracking system based on the at least one subsequent movement, for the real-time tracking of the moving target object.

7. The object tracking system as claimed in claim 6, the processor is further configured to determine one or more subsequent locations associated with the moving target object, based on the direction of movement, wherein the one or more subsequent locations are used as the potential locations for the real-time tracking.

8. The object tracking system as claimed in claim 6, wherein during the complete occlusion, the at least one subsequent movement is determined based on the potential locations for varying the direction of movement of the object tracking system.

9. The object tracking system as claimed in claim 6, wherein when the partial occlusion is greater than a predefined threshold value, the at least one subsequent movement is determined based on the movement data associated with the occlusion, for varying the direction of movement of the object tracking system.

10. The object tracking system as claimed in claim 6, wherein when the partial occlusion is lesser than a predefined threshold value, the at least one subsequent movement is determined based on at least one of the one or more preceding positions and the one or more preceding movements, for varying the direction of movement of the object tracking system.

11. A non-transitory computer readable medium including instructions stored thereon that when processed by at least one processor cause a device to perform operations comprising:
  detecting an occlusion in a view of real-time tracking of a moving target object, wherein the occlusion comprises one of a complete occlusion and a partial occlusion in the view of the real-time tracking; and
  performing upon the detection and until the moving target object is retraced by overcoming the occlusion, the steps of:
    determining at least one subsequent movement of the object tracking system for retracing the moving target object,
    (i) based on potential locations associated with the moving target object, during the complete occlusion, wherein the potential locations are historic data indicative of nearest locations visited by the moving target object from a current location in the environment; and
    (ii) based on one or more preceding movements and one or more preceding positions of the real-time tracking of the moving target object, and movement data associated with the occlusion, during the partial occlusion, wherein the one or more preceding movements and the one or more preceding positions of the moving target object are determined using Visual Simultaneous Localization and Mapping (VSLAM) technique that logs one or more paths and one or more locations associated with the moving target object, before the detection of occlusion; and
    varying direction of movement of the object tracking system based on the at least one subsequent movement, for the real-time tracking of the moving target object.

12. The medium as claimed in claim 11 further comprising determining one or more subsequent locations associated with the moving target object, based on the direction of movement, wherein the one or more subsequent locations are used as the potential locations for the real-time tracking.

13. The medium as claimed in claim 11, wherein during the complete occlusion, the at least one subsequent movement is determined based on the potential locations for varying the direction of movement of the object tracking system.

14. The medium as claimed in claim 11, wherein when the partial occlusion is greater than a predefined threshold value, the at least one subsequent movement is determined based on the movement data associated with the occlusion, for varying the direction of movement of the object tracking system.

15. The medium as claimed in claim 11, wherein when the partial occlusion is lesser than a predefined threshold value, the at least one subsequent movement is determined based on at least one of the one or more preceding positions and the one or more preceding movements, for varying the direction of movement of the object tracking system.

* * * * *